United States Patent
Hirayama et al.

(10) Patent No.: US 11,375,080 B2
(45) Date of Patent: Jun. 28, 2022

(54) INFORMATION PROCESSING APPARATUS AND SEMICONDUCTOR DEVICE FOR WRITING DATA TO A VOLATILE MEMORY THROUGH PLUARL COMMUNICATION PATHWAY

(71) Applicant: FUJIFILM Business Innovation Corp., Tokyo (JP)

(72) Inventors: Yuya Hirayama, Kanagawa (JP); Tsutomu Nakaminato, Kanagawa (JP); Kenji Kuroishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 154 days.

(21) Appl. No.: 16/563,920

(22) Filed: Sep. 8, 2019

(65) Prior Publication Data
US 2020/0092438 A1 Mar. 19, 2020

(30) Foreign Application Priority Data
Sep. 19, 2018 (JP) .............................. JP2018-175458

(51) Int. Cl.
*H04N 1/32* (2006.01)
*G06F 13/40* (2006.01)
(Continued)

(52) U.S. Cl.
CPC ..... *H04N 1/32411* (2013.01); *G06F 13/4022* (2013.01); *G06K 15/1818* (2013.01); *H04N 1/2141* (2013.01); *H04N 2201/0094* (2013.01)

(58) Field of Classification Search
None
See application file for complete search history.

(56) References Cited

U.S. PATENT DOCUMENTS 6,075,953 A * 6/2000 Kida .................. G03G 15/5079
399/10
7,716,392 B2 5/2010 Kobayashi
(Continued)

FOREIGN PATENT DOCUMENTS

JP 2004046851 2/2004
JP 2004-170475 6/2004
(Continued)

OTHER PUBLICATIONS

Takanobu Baba et al., "Computer Architecture" with partial English translation thereof, Ohmsha, Nov. 2011, pp.1-15.
(Continued)

*Primary Examiner* — Haris Sabah
(74) *Attorney, Agent, or Firm* — JCIPRNET

(57) ABSTRACT

An information processing apparatus includes a volatile memory that stores data, a controller that controls an operation of a device, an interface that temporarily stores data input from the device, a writing unit that controls writing of the data on the volatile memory, a first communication pathway that connects the interface to the writing unit and is used to transmit the data acquired by the interface to the volatile memory and to transfer the data written on the volatile memory, a second communication pathway that connects the interface to the writing unit and does not share a route with the first communication pathway, and a switching unit that switches a communication path used to transmit data from the interface to the volatile memory from the first communication pathway to the second communication pathway if the interface has received image data from the device.

7 Claims, 5 Drawing Sheets

(51) Int. Cl.
*H04N 1/21* (2006.01)
*G06K 15/02* (2006.01)

(56) References Cited

U.S. PATENT DOCUMENTS

| | | | | |
|---|---|---|---|---|
| 2003/0035132 | A1* | 2/2003 | Tomita | H04N 1/00204 358/1.14 |
| 2007/0255864 | A1 | 11/2007 | Moriwaki | |
| 2012/0287299 | A1* | 11/2012 | Utsugi | H04N 9/04559 348/222.1 |
| 2015/0022849 | A1* | 1/2015 | Montierth | G06F 12/0246 358/1.15 |
| 2015/0181194 | A1* | 6/2015 | Izawa | G02B 7/34 348/49 |
| 2016/0088189 | A1* | 3/2016 | Atsumi | H04N 1/2104 358/1.17 |

FOREIGN PATENT DOCUMENTS

| | | |
|---|---|---|
| JP | 2006031227 | 2/2006 |
| JP | 2007299237 | 11/2007 |

OTHER PUBLICATIONS

"Office Action of Japan Counterpart Application" with English translation thereof, dated Apr. 5, 2022, p. 1-p. 6.

\* cited by examiner

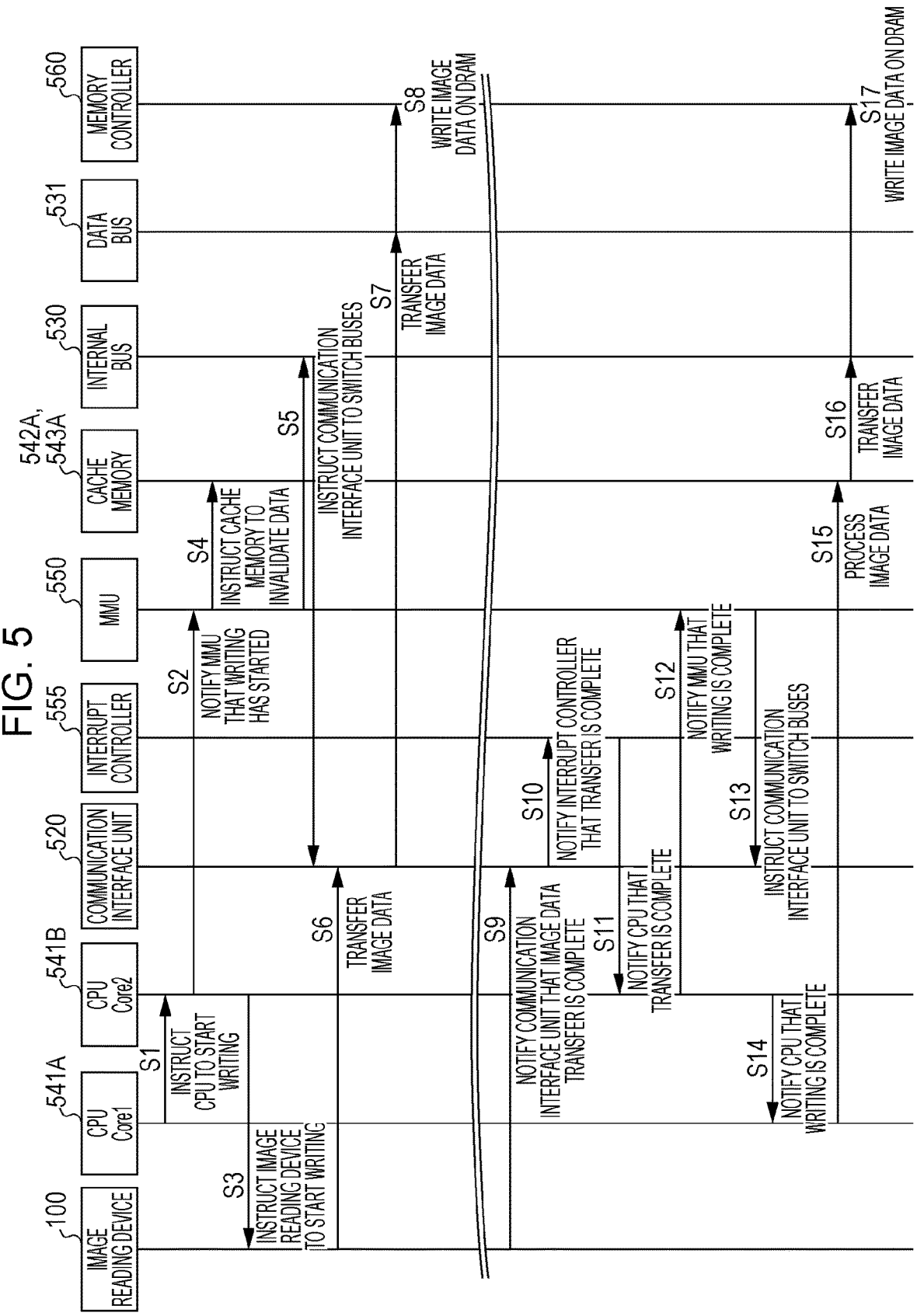

INFORMATION PROCESSING APPARATUS AND SEMICONDUCTOR DEVICE FOR WRITING DATA TO A VOLATILE MEMORY THROUGH PLUARL COMMUNICATION PATHWAY

CROSS-REFERENCE TO RELATED APPLICATIONS

This application is based on and claims priority under 35 USC 119 from Japanese Patent Application No. 2018-175458 filed Sep. 19, 2018.

BACKGROUND (i) Technical Field

The present disclosure relates to an information processing apparatus and a semiconductor device.

(ii) Related Art

Japanese Unexamined Patent Application Publication No. 2004-170475 discloses a display device control circuit that is connected to an internal bus and an image-only bus and a selection circuit that selectively switches between data from the internal bus and data from the image-only bus. The selection circuit selects the data from one of the two bases, depending on a value in a register in each of selectors.

When an information processing apparatus receives data from a device, data is written on a volatile memory. While the data is being written on the volatile memory, a communication path that is used to transmit data to the volatile memory or to transfer the data written on the volatile memory is occupied.

If the data to be written on the volatile memory is a vast amount of continuous data, such as image data, time consumed to write the data on the volatile memory is longer, and time throughout which the communication path is occupied is also longer.

SUMMARY

Aspects of non-limiting embodiments of the present disclosure relate to providing shorter time of occupation of a communication path regardless of a type of data to be acquired than when communication paths used to transmit data to the volatile memory are not switched.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus. The information processing apparatus includes a volatile memory that stores data, a controller that controls an operation of a device, an interface that temporarily stores data input from the device, a writing unit that controls writing of the data on the volatile memory, a first communication pathway that connects the interface to the writing unit and is used to transmit the data acquired by the interface to the volatile memory and to transfer the data written on the volatile memory, a second communication pathway that connects the interface to the writing unit and does not share a route with the first communication pathway, and a switching unit that switches a communication path used to transmit data from the interface to the volatile memory from the first communication pathway to the second communication pathway if the interface has received image data from the device.

BRIEF DESCRIPTION OF THE DRAWINGS

Exemplary embodiment of the present disclosure will be described in detail based on the following figures, wherein:

FIG. 5 illustrates a process performed when image data is read onto a dynamic random-access memory (DRAM) from the image reading device.

DETAILED DESCRIPTION

Exemplary embodiment of the disclosure is described in detail below with reference to the drawings.

The image forming apparatus is described as the exemplary embodiment. The image forming apparatus of the exemplary embodiment forms an image on a paper sheet and has a copy function, a scan function, a fax transmission and reception function, and a print function.

The image forming apparatus does not necessarily have to have all these functions, but may be an apparatus having only one particular function, such as a copying machine, a scanner (including a three-dimensional scanner), a facsimile transceiver, or a printer (including a three-dimensional printer).

Figure 1:
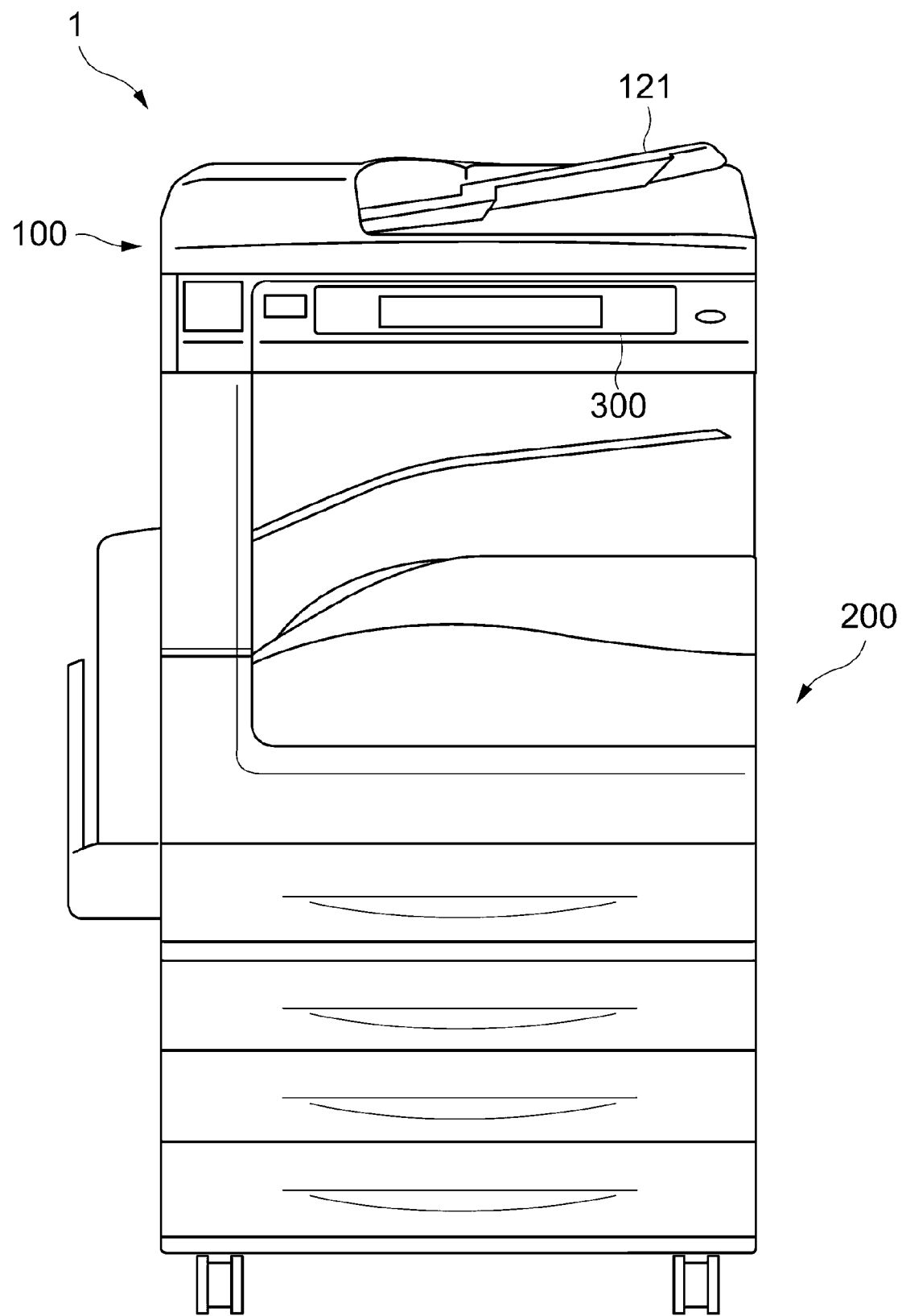
FIG. 1 is an external view of an image forming apparatus of an exemplary embodiment.
Figure 2:
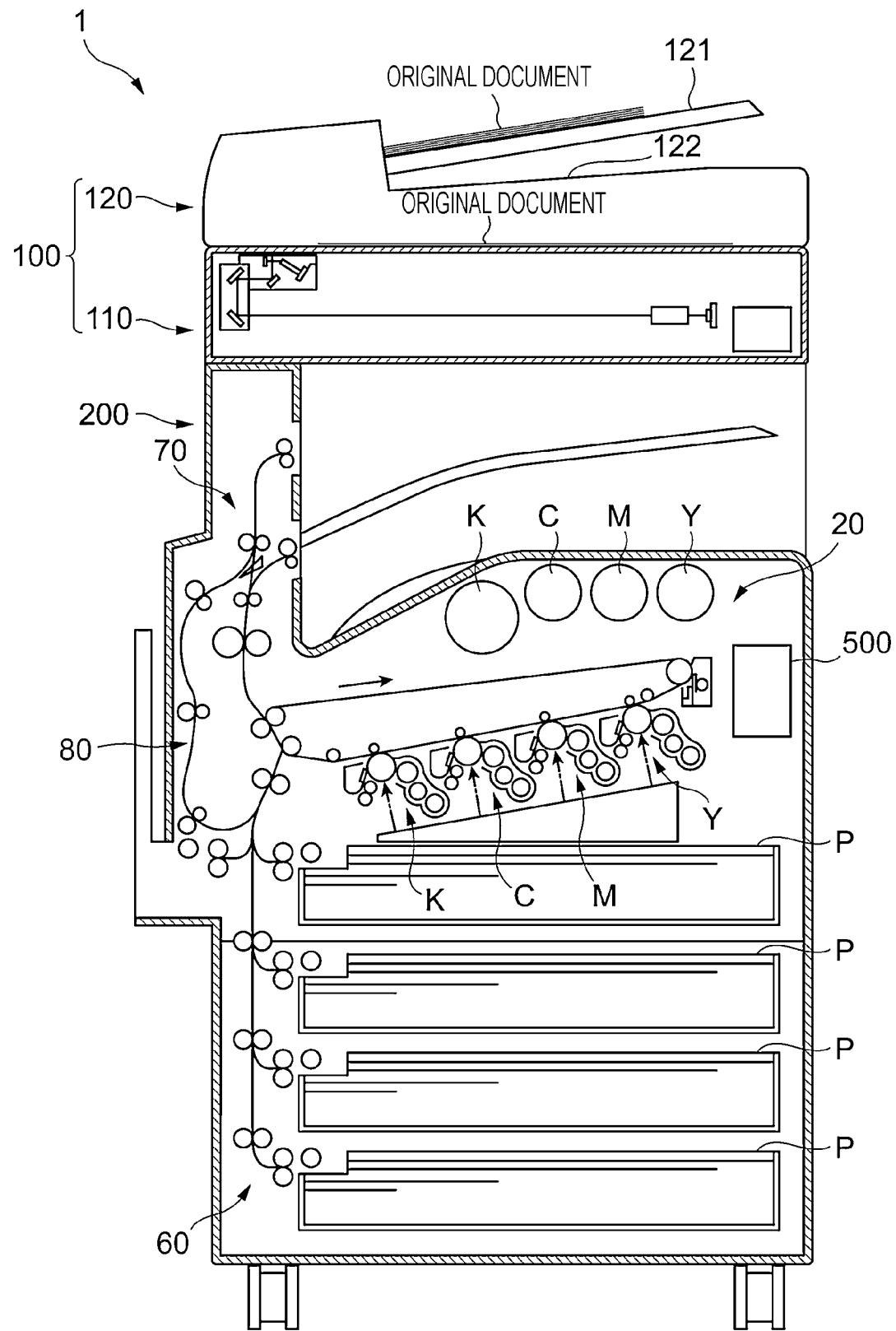
FIG. 2 illustrates an internal structure of the image forming apparatus of the exemplary embodiment.

FIG. 1 is an external view of an image forming apparatus 1 of the exemplary embodiment. FIG. 2 illustrates an internal structure of the image forming apparatus 1 of the exemplary embodiment.

The image forming apparatus 1 includes an image reading device 100 that receives an image of an original document and an image recording device 200 that records an image on a paper sheet.

The image forming apparatus 1 further includes a user interface (UI) 300 that is used to receive an operation performed by a user and to display a variety of information to the user.

The image forming apparatus 1 further includes a control device 500 that controls the entire operation of the image forming apparatus 1.

The image forming apparatus 1 is an example of an information processing apparatus. The control device 500 is also an example of the information processing apparatus.

The image reading device 100 is mounted on top of the image recording device 200. The image reading device 100 optically reads the image of an original document.

The image recording device 200 is configured to be an engine that forms an image and is configured to be a mechanism for use in transporting a paper sheet. The image recording device 200 includes the control device 500.

The user interface 300 is mounted on the front portion of the image reading device 100 such that the front surface of the user interface 300 faces a user who operates the image forming apparatus 1.

The image reading device 100 includes an image reading unit 110 that reads the image of an original document and a document transport unit 120 that transports the original document to the image reading unit 110. The document transport unit 120 is mounted in the top portion of the image reading device 100, and the image reading unit 110 is mounted in the bottom portion of the image reading device 100.

The document transport unit 120 includes a document tray 121 that holds the original document and a document discharge tray 122 into which the original document picked up from the document tray 121 is discharged. The document transport unit 120 transports the original document from the document tray 121 to the document discharge tray 122 using a transport mechanism (not illustrated).

The document transport unit 120 is also referred to as an auto document feeder (ADF).

The document transport unit 120 also reads the image of the original document by relatively moving an optical reading system with respect to the original document.

The image recording device 200 includes an image forming unit 20, paper sheet feeders 60, a paper sheet discharge unit 70, and a reverse transport unit 80. The image forming unit 20 forms an image on a paper sheet P picked up from a paper sheet tray. The paper sheet feeders 60 feed the paper sheet P to the image forming unit 20. The paper sheet discharge unit 70 discharges the paper sheet P having an image formed by the image forming unit 20. The reverse transport unit 80 turns upside down the paper sheet P output from the image forming unit 20 and transports the paper sheet P back to the image forming unit 20.

The structures of these elements are disclosed in the related art, and the detailed discussion thereof is omitted herein. The image forming unit 20 includes recording sub-units for black (K), cyan (C), magenta (M), and yellow (Y) colors arranged along the transport route of the paper sheet P. The type and combination of colors are described for exemplary purposes only.

The user interface 300 includes a receiving unit that receives an instruction from a user and an image output device that provides information to the user. Specifically, the user interface 300 includes an operation receiving unit and a display.

The operation receiving unit provides a function of detecting an operation performed on a hardware key and a function of detecting an operation performed on a software key. On the other hand, the display displays a screen for providing information, a software key, and the like.

Figure 3:
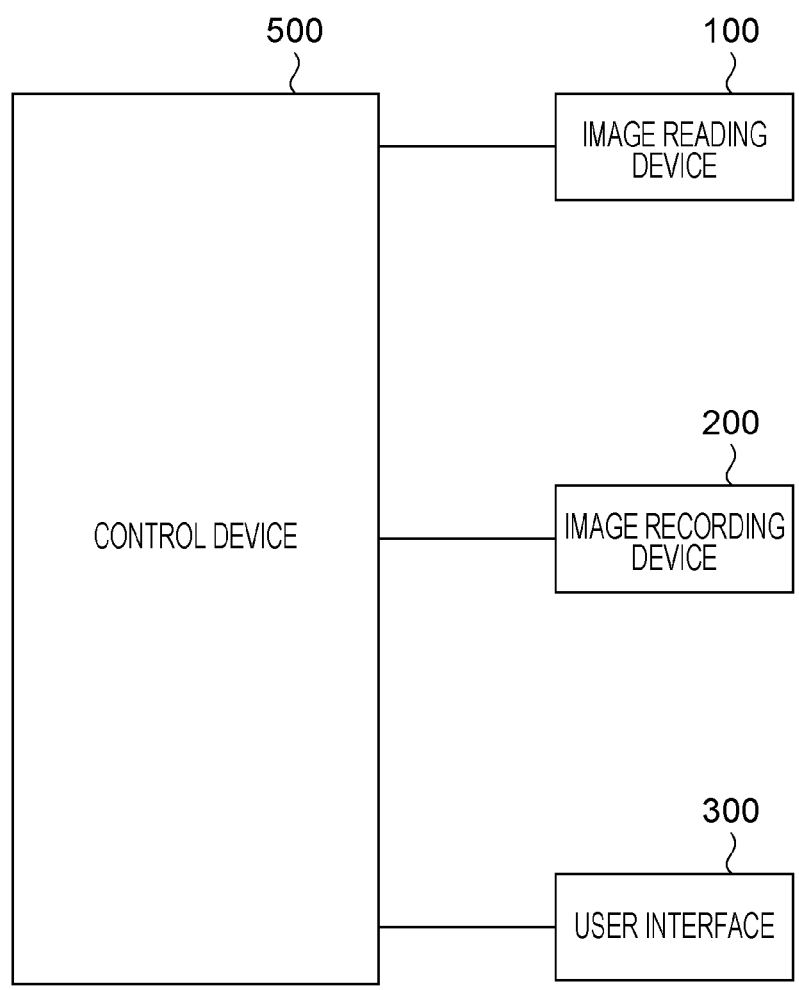
FIG. 3 illustrates a connection configuration between function modules of a control device forming the image forming apparatus.

FIG. 3 illustrates a connection configuration between function modules including the control device 500 forming the image forming apparatus 1.

The image reading device 100, the image recording device 200, and the user interface 300 are connected to the control device 500. A semiconductor chip having a functional modular construction is included in each of the image reading device 100, the image recording device 200, the user interface 300, and the control device 500.

The exemplary embodiment uses Mochi (registered trademark). Mochi is a modular chip having a single function mounted on a single semiconductor substrate.

The control device 500 includes a Mochi chip. The Mochi chip is a single semiconductor substrate including an integration of a communication interface dedicated to connecting with another Mochi chip, a central processing unit (CPU) core, a memory controller, and a related logic circuit. The Mochi chip is a system on a chip (SOC).

The interconnection method for the Mochi chips may be a parallel connection configuration or a serial connection configuration. The exemplary embodiment is in the serial connection configuration. Specifically, the exemplary embodiment transfers data between the Mochi chips via the serial connection configuration.

Figure 4:
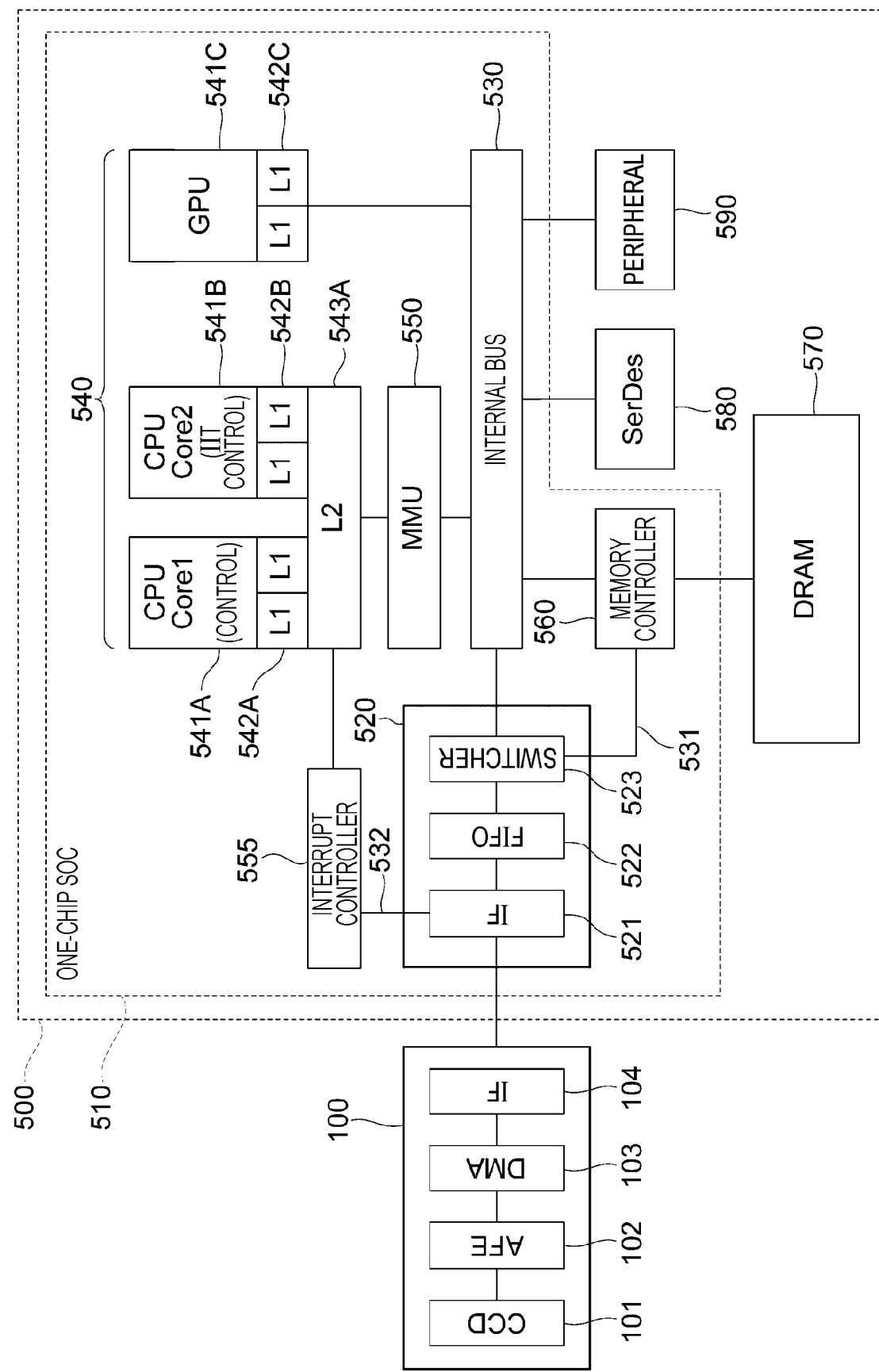
FIG. 4 illustrates an example of internal structures of an image reading device and the control device.

FIG. 4 illustrates an example of the internal structure of the image reading device 100 and the control device 500.

The image reading device 100 includes an image sensor 101 that captures an image of an original document, an analog front end (AFE) 102 that processes a signal output from the image sensor 101, a direct memory access (DMA) 103 that transfers data to a dynamic random-access memory (DRAM) 570, and a Mochi interface module 104.

The Mochi interface module 104 is a Mochi chip.

In accordance with the exemplary embodiment, the image sensor 101 may be a charge-coupled device (CCD) image sensor. The image sensor 101 may be a complementary metal oxide semiconductor (CMOS) image sensor.

The image sensor 101 outputs color signals for red (R), green (G), and blue (B) as output signals for an image of each original document.

The AFE 102 converts the color signals for red (R), green (G), and blue (B) to color signals for yellow (Y), magenta (M), cyan (C), and black (K).

The DMA 103 controls reading and writing of data performed not via the CPU (a first CPU core 541A or a second CPU core 541B). The DMA 103 of the exemplary embodiment transfers image data read from an original document to the DRAM 570. The data to be transferred by the DMA 103 includes address information specifying a writing destination in addition to the image data. The address information includes a writing start address and a destination address. In accordance with the exemplary embodiment, the address information denotes a storage destination of data. The address information is also a physical address of the DRAM 570.

The Mochi interface module 104 of the exemplary embodiment transfers the image data in a continuous data format that is not packetized (non-packet format). In other words, the Mochi interface module 104 transfers the image data of the original document in a batch transmission.

The control device 500 connected to the image reading device 100 via an external bus includes a system on a line (SOC) 510 that is a single chip including an integration of multiple processing cores, the DRAM 570 serving as a storage device, a serial-to-parallel converter (SerDes) 580, and a peripheral interface 590. Referring to FIG. 4, the SOC 510 is also referred to as one chip SOC.

The SOC 510 is an example of a semiconductor device, and the DRAM 570 is an example of a volatile memory.

The SOC 510 includes a communication interface unit 520 that receives writing data via the external bus and the internal bus 530 that transfers packet data of a predetermined size (such as 64 bytes). The SOC 510 further includes a first data bus 531 that connects the communication interface unit 520 to a memory controller 560, a second data bus 532 that connects the communication interface unit 520 to an interrupt controller 555, and a process core module 540 that processes packet data. The SOC 510 further includes a memory management unit 550 that manages a cache memory of the process core module 540, the interrupt controller 555 that controls an interrupt during a data reading operation, and the memory controller 560 that controls data writing to and reading from the DRAM 570.

The communication interface unit 520 includes a Mochi interface (IF) module 521, a first-in first-out (FIFO) memory 522, and a switcher 523.

The Mochi interface module 521 is serially connected to the Mochi interface module 104 on the image reading device 100 via the external bus, and receives address information (0x0 through 0xFFFF) and data to be written in a continuous data format (non-packet data format) corresponding to each address. In the serial transmission format, the address information is transferred prior to the data to be written. When the Mochi interface module 521 is notified that the transfer of the image data has completed, the Mochi interface module 521 transfers a completion notification to the interrupt controller 555 via the second data bus 532. A determination as to whether the Mochi interface module 521 is to transfer the acquired data to the interrupt controller 555 is made in accordance with header information contained in the acquired data.

The FIFO memory 522 is a buffer memory that temporarily stores the data received via the external bus.

The switcher 523 transfers the data output from the FIFO memory 522 to the memory controller 560 via the internal bus 530. The switcher 523 is configured to switch a communication path to transfer data to the memory controller 560 from the internal bus 530 to the first data bus 531. In other words, the switcher 523 is enabled to transfer data to the memory controller 560 via the first data bus 531.

The internal bus 530 interconnects the communication interface unit 520, the memory management unit 550, the memory controller 560, and the like to exchange packet data.

The internal bus 530 is an example of a first communication pathway. While any device transfers packet data via the internal bus 530, the internal bus 530 is occupied, and another device is unable to transfer data by using the internal bus 530.

The first data bus 531 is a serial bus or a parallel bus, which is used to directly transfer data received by the image reading device 100 to the memory controller 560. The first data bus 531 is an example of a second communication pathway.

The first data bus 531 is physically independent of the internal bus 530. The internal bus 530 and the first data bus 531 do not share any common path portion.

The process core module 540 of the exemplary embodiment includes the first central processing unit (CPU) core 541A that controls the whole operation of the image forming apparatus 1, the second CPU core 541B that controls the operation of the image reading device 100, and a graphics processing unit (GPU) 541C that processes an image. The process core module 540 is thus multi-core structured.

Each of the first CPU core 541A, the second CPU core 541B, and the GPU core 541C is an example of a processing unit. In a broader sense, the process core module 540 is also an example of the processing unit.

The first CPU core 541A and the second CPU core 541B are an example of a controller that controls the operation of a device. In a broad sense, the process core module 540 is also an example of the controller.

The second CPU core 541B transmits to the memory management unit 550 a physical address associated with predetermined data.

In accordance with the exemplary embodiment, when the image forming apparatus 1 starts up, the second CPU core 541B transmits to the memory management unit 550 the physical addresses (for example, address 1 through address 5000) associated with image data read from the image reading device 100 and written on the DRAM 570.

The first CPU core 541A and the second CPU core 541B of the exemplary embodiment operate in accordance with Linux (registered trademark) kernel as an operating system or Linux operating system.

Linux manages addresses in a virtual address space and is thus different from Windows (registered trademark) that manages addresses in a physical address space. Linux is thus unable to use a switch process that selects the presence or absence of cache data.

However, Windows or another operating system may be used. For example, Windows CE (registered trademark) may be used.

In accordance with the exemplary embodiment, the first CPU core 541A and the second CPU core 541B include respectively primary cache memories 542A and 542B and commonly include a secondary cache memory 543A.

The GPU core 541C includes a primary cache memory 542C.

The primary cache memories 542A, 542B, and 542C, and the secondary cache memory 543A are volatile memories that are smaller in memory capacity than and faster in reading and writing speed than the DRAM 570.

The primary cache memories 542A, 542B, and 542C, and the secondary cache memory 543A are examples of a second volatile memory.

The primary cache memories 542A and 542B are volatile memories that are smaller in memory capacity than and faster in reading and writing speed than the secondary cache memory 543A.

The memory management unit 550 is an example of an instruction unit. When the second CPU core 541B notifies the memory management unit 550 of the beginning of the writing of image data onto the DRAM 570, the memory management unit 550 instructs the switcher 523 to switch the communication path to transfer data to the DRAM 570 from the internal bus 530 to the first data bus 531. The notification of the beginning of the writing of the image data is understood as an instruction to acquire the image data.

When the second CPU core 541B notifies the memory management unit 550 of the end of the writing of the image data onto the DRAM 570, the memory management unit 550 instructs the switcher 523 to switch the communication path to transfer data to the DRAM 570 from the first data bus 531 to the internal bus 530.

The memory management unit 550 manages, by a physical address, address information corresponding to the data to be stored onto the primary cache memories 542A and 542B and the secondary cache memory 543A.

When the memory management unit 550 is notified of the beginning of the writing of the image data, the memory management unit 550 references physical addresses (address 1 through address 5000) that are acquired from the second CPU core 541B when the image forming apparatus 1 starts up. The memory management unit 550 instructs the secondary cache memory 543A and the storage region of the cache memory 542A to invalidate cache data (image data for address 1 through address 5000) corresponding to the physical address referenced. The internal bus 530 is not used to transfer the instruction to invalidate the cache data. The memory management unit 550 may be understood as an invalidating unit that invalidates the cache data.

In accordance with the exemplary embodiment, the memory management unit 550 is notified of the beginning of the writing of the image data, and a flag register in the memory management unit 550 is set to be on. The instruction to invalidate the cache data is thus provided.

On the other hand, if the memory management unit 550 is notified of the beginning of the writing of the data having no continuity, namely, data different from the image data, the flag register in the memory management unit 550 is not set to be on, and the memory management unit 550 does not provide an instruction to invalidate the cache data. In such a case, the memory management unit 550 does not instruct the switcher 523 to switch the communication path to the first data bus 531.

In the exemplary embodiment, the instruction to invalidate means that management information used to manage updating of the cache data corresponding to a physical address referenced is modified to an updated status (dirty bit). The management information further includes information indicating a valid status and a shared status.

When the interrupt controller 555 receives from the Mochi interface module 521 a completion notification indicating completion of the transfer of the image data, the interrupt controller 555 transfers the completion notification to the second CPU core 541B.

The memory controller 560 is a circuit that controls the writing or reading of data from or to the DRAM 570 and refreshing of the DRAM 570.

The memory controller 560 is connected to the internal bus 530 and exchanges packet data with another device connected to the internal bus 530.

For example, the memory controller 560 reads or writes data in response to a request from the first CPU core 541A, the second CPU core 541B, or the GPU core 541C.

The memory controller 560 writes the data transferred from the DMA 103 onto the DRAM 570.

The memory controller 560 is an example of a writing unit.

The DRAM 570 of the exemplary embodiment has a storage region that stores four pages of image data document having a sheet size of A3. Physical addresses (for example, address 1 through address 10000) are allocated to the storage region. One Half of the storage region, namely, a sub-region for two pages of image data document stores a front page of the image data document (for example, raw data corresponding to address 1 through address 2500) and a back page of the image data (for example, raw data corresponding to address 2501 through address 5000), each page read by the image reading device 100. The other half of the storage region stores a front page of image data (for example, processed data corresponding to address 5001 through address 7500) and a back page of image data (for example, processed data corresponding to address 7501 through address 10000), each page obtained when the first CPU core 541A has processed the raw data. The process to be performed by the first CPU core 541A includes a rotation operation, an inversion operation, an expansion operation, and a reduction operation of the raw data.

The DRAM 570 may further include a storage region to store data other than the four pages of the image data.

The image forming apparatus 1 operates as described below.

The image forming apparatus 1 performs a copying process by using the image reading device 100 and the image recording device 200. Specifically, the image forming apparatus 1 transfers the image data of the document read by the image reading device 100 to the image recording device 200. The image recording device 200 thus forms the image of the original document on the paper sheet P.

The copying process includes a direct copying operation and an image storage copying operation.

In the direct copying operation, the image data read by the image reading device 100 (the read data) is written onto the DRAM 570 as a volatile memory, and the data is then read from the DRAM 570 and supplied to the image recording device 200 to form the image on the paper sheet P.

On the other hand in the image storage copying operation, the image data read by the image reading device 100 (the read data) is written onto the DRAM 570 as the volatile memory, and the data is then read onto the process core module 540 to be compressed in a compression operation. The compressed image data is written onto a hard disk device (not illustrated) as a non-volatile memory (auxiliary storage device). The image data is then read from the hard disk device, and transferred to the image recording device 200 for decompression. The image corresponding to the decompressed image data is formed on the paper sheet P.

A semiconductor memory as a non-volatile memory, namely a solid state drive (SSD) may be used instead of the hard disk drive.

The image forming apparatus 1 receives a print job from a personal computer (PC) (not illustrated) and forms an image corresponding to the received print job on the paper sheet P. Specifically, the image forming apparatus 1 provides to the image recording device 200 the image data corresponding to the print job received via a communication system and forms the corresponding image on the paper sheet P. In one way, the image data is transferred from the DRAM 570 to the image recording device 200 after the received image data is written onto the DRAM 570. In another way, the image data is transferred to the image recording device 200 from a hard disk device after the image read from the DRAM 570 is written onto the hard disk device.

The image forming apparatus 1 may transmit and receive the image data. Specifically, the image forming apparatus 1 may transmit via a communication network the image data of the original document read by the image reading device 100. In this case as well, in one way, the image data is transferred from the DRAM 570 to a communication interface (not illustrated) after the image data is written onto the DRAM 570, and in another way, the image data is transferred to the communication interface after the image data is transferred from the DRAM 570 to the hard disk drive.

The image forming apparatus 1 may store the image data of the original document on an auxiliary storage device, such as the hard disk drive. Specifically, the image forming apparatus 1 may store the image data of the original document on the auxiliary storage device on the PC connected via the communication network.

FIG. 5 illustrates a process performed when the image data is read from the image reading device 100 and written onto the DRAM 570. In the operation described below, a page of image data document having a sheet size of A3 (data corresponding to address 1 through address 2500) is written.

The first CPU core 541A instructs the second CPU core 541B to start writing the image data onto the DRAM 570 (step S1).

The second CPU core 541B notifies the memory management unit 550 of the beginning of the writing of the image data onto the DRAM 570 (step S2). The second CPU core 541B instructs the image reading device 100 to start writing the image data onto the DRAM 570 (step S3).

Upon receiving the notification from the second CPU core 541B, the memory management unit 550 references physical addresses (address 1 through address 5000) acquired from the second CPU core 541B in advance. The memory management unit 550 then instructs the first CPU core 541A and the secondary cache memory 543A to invalidate the cache data (the image data) corresponding to the referenced physical addressed (step S4). The instruction to invalidate is issued in a batch transmission with respect to the image data that is not packetized.

If the first CPU core 541A and the secondary cache memory 543A modifies, to an updated status, management information about data that has been invalidated. Specifically, the first CPU core 541A and the secondary cache memory 543A sets a dirty bit to be on.

The memory management unit 550 instructs the switcher 523 in the communication interface unit 520 to switch the communication path for data transfer from the first data bus 531 to the internal bus 530 (step S5). The instruction is transmitted via the internal bus 530.

The image reading device 100 transfers the image data to the communication interface unit 520 (step S6).

The switcher 523 in the communication interface unit 520 transfers the image data to the memory controller 560 via the first data bus 531 (step S7).

The memory controller 560 writes the image data transferred from the first data bus 531 onto the physical addresses of the DRAM 570 corresponding to the image data (step S8).

Upon transferring the image data to the control device 500, the image reading device 100 notifies the Mochi interface module 521 in the communication interface unit 520 that the transfer of the image data has completed (step S9).

The Mochi interface module 521 in the communication interface unit 520 transfers the completion notification of the image data to the interrupt controller 555 via the second data bus 532 (step S10).

The interrupt controller 555 transfers the completion notification of the image data to the second CPU core 541B (step S11).

The second CPU core 541B notifies the memory management unit 550 that the writing of the image data onto the DRAM 570 has completed (step S12). Specifically, the second CPU core 541B transmits to the memory management unit 550 that completion information indicating that the writing of the image data onto the DRAM 570 has completed.

Upon receiving the completion information, the memory management unit 550 instructs the switcher 523 in the communication interface unit 520 to switch the communication path for the data transfer from the first data bus 531 to the internal bus 530 (step S13).

The second CPU core 541B notifies the first CPU core 541A that the writing of the image data onto the DRAM 570 has completed (step S14).

The first CPU core 541A instructs the DRAM 570 via the internal bus 530 to read the image data written on the DRAM 570 (raw data corresponding to address 1 through address 2500).

The memory management unit 550 acquires the image data from the DRAM 570 via the internal bus 530, and stores the image data onto the cache memory 542A and the secondary cache memory 543A.

The first CPU core 541A processes the image data (raw data) stored on the cache memory 542A and the secondary cache memory 543A (step S15), and transfers the processed image data (data corresponding to address 5001 through address 7500) to the memory controller 560 via the internal bus 530 (step S16).

The memory controller 560 writes the processed image data onto the DRAM 570 (step S17).

In accordance with the exemplary embodiment, when the communication interface unit 520 has acquired the image data from the image reading device 100, the communication path used to transmit the image data from the communication interface unit 520 to the DRAM 570 is switched from the internal bus 530 to the first data bus 531.

When data is read from a device, such as the image reading device 100, and the read data is written onto the DRAM 570, the data may be written via the internal bus 530. Since the internal bus 530 is occupied by the data during a period throughout which the data is being written on the DRAM 570, the transfer of data via the internal bus 530 by another device is restricted.

If the data to be written is continuous data, such as the image data, the amount of data is larger, and time to write the data onto the DRAM 570 becomes longer. As a result, the time period throughout which the data transfer via the internal bus by the other device is restricted becomes longer.

In accordance with the exemplary embodiment, the process core module 540 has a multi-core structure, and the usage rate of the internal bus 530 is relatively higher than in a single-core structure. Since the shared communication path of data as the data communication path in the single chip SOC is only the internal bus 530, the internal bus 530 is more likely to be occupied. The data transfer via the internal bus 530 by the other device is more likely to be restricted.

In accordance with the exemplary embodiment, the data to be read and written is the image data. If the communication path used to transmit the image data to the DRAM 570 is switched from the internal bus 530 to the first data bus 531, the time period throughout which the internal bus 530 is occupied to write the image data onto the DRAM 570 may be shortened.

In accordance with the exemplary embodiment, if the second CPU core 541B has instructed the memory management unit 550 to acquire the image data from a device, such as the image reading device 100, the memory management unit 550 instructs the switcher 523 to switch the communication path used to transmit the image data from the internal bus 530 to the first data bus 531.

In accordance with the exemplary embodiment, if the memory management unit 550 acquires the completion information indicating that the writing of the image data on the DRAM 570 has completed, the memory management unit 550 instructs the switcher 523 to switch the communication path used to transmit the data to the DRAM 570 from the first data bus 531 to the internal bus 530.

In accordance with the exemplary embodiment, if the second CPU core 541B has instructed the memory management unit 550 to acquire the image data from the device, such as the image reading device 100, the memory management unit 550 invalidates data for the address information corresponding to the image data out of the data stored on the cache memory 542A and the secondary cache memory 543A.

In accordance with the exemplary embodiment, the second CPU core 541B transmits the address information corresponding to the image data to the memory management unit 550 before instructing the memory management unit 550 to acquire the image data. When the memory management unit 550 receives the instruction from the second CPU core 541B, the memory management unit 550 invalidates the data on the cache memory 542A and the secondary cache memory 543A corresponding to the address information acquired from the first CPU core 541A.

In accordance with the exemplary embodiment, the first CPU core 541A and the second CPU core 541B process the cache data on the primary cache memories 542A and 542B and the secondary cache memory 543A by using the operating system that manages in a virtual address space the address information corresponding to the cache data.

In accordance with the exemplary embodiment, the physical addresses are allocated to the DRAM 570 as the address information corresponding to the data to be stored. On the other hand, the memory management unit 550 manages in a physical address space the address information corresponding to the cache data on the primary cache memories 542A and 542B and the secondary cache memory 543A. The physical address is the address information allocated to the storage region of the DRAM 570.

The image reading device 100 and the image recording device 200, and the control device 500 are integrated into the image forming apparatus 1 (see FIG. 1) of the exemplary embodiment as a unitary body. However, the image reading device 100 and the image recording device 200 (see FIG. 1) may be configured in separate housings.

The image forming apparatus 1 of the exemplary embodiment is assumed to be used as an office machine but may be used as an image forming apparatus for commercial production lines.

In accordance with the exemplary embodiment, the communication interface unit 520 (see FIG. 4) is used to transfer the image data in the image forming apparatus 1 (see FIG. 1) including the image recording device 200 (see FIG. 1). Alternatively, the communication interface unit 520 may be used to transfer the image data in an image processing apparatus that is dedicated to an image reading function.

The communication interface unit 520 may also be used to read data from a device other than the image reading device 100 and to write the read data on the DRAM 570 (see FIG. 4).

In accordance with the exemplary embodiment, the management information of the cache data corresponding to the physical addresses for the image data is invalidated. Alternatively, the cache data may be directly invalidated.

The exemplary embodiment has been described in each of two cases. In one case the cache data on the SOC 510 has a single-layer structure (the GPU core 541C), and in the other case the cache data on the SOC 510 has a double-layer structure (the first CPU core 541A and the second CPU core 541B). In either case, the cache data is not limited to the layer structures described above. For example, the cache data may have a three-layer structure.

The exemplary embodiment includes the semiconductor chip that is free from a function block that does not operate on a per functional module basis. In other words, the Mochi chip including function blocks selectively combined for an operation is used. A semiconductor chip in a different configuration may be used. For example, a semiconductor chip may include a set of function blocks serving as a system and mounted on a single semiconductor substrate.

A connection system of the functional modules may be different from the connection system of the Mochi interface modules.

In accordance with the exemplary embodiment, the second CPU core 541B transmits the physical addresses associated with the image data to the memory management unit 550 when the image forming apparatus 1 starts up. The timing when the physical address is transmitted to the memory management unit 550 may be prior to when the notification concerning the writing of the image data read from the image reading device 100 on the DRAM 570 is transmitted to the memory management unit 550.

In accordance with the exemplary embodiment, the memory management unit 550 provides the instruction to invalidate the cache data before providing the instruction to switch the communication path transmitting the data. Alternatively, the memory management unit 550 provides the instruction to invalidate the cache data after providing the instruction to switch the communication path transmitting the data. Alternatively, the memory management unit 550 provides in a parallel operation the instruction to invalidate the cache data and the instruction to switch the communication path transmitting the data.

In accordance with the exemplary embodiment, the communication interface unit 520 includes the switcher 523. Alternatively, the communication interface unit 520 and the switcher 523 may be separately mounted from each other.

In accordance with the exemplary embodiment, the shared communication path serving as a data communication path in the one-chip SOC is only the internal bus 530. Alternatively, another communication path different from the internal bus 530 may be arranged as a shared communication path.

In accordance with the exemplary embodiment, the memory management unit 550 manages the cache data on the first CPU core 541A and the second CPU core 541B. In addition, the memory management unit 550 may further manage the cache data on the GPU core 541C. Specifically, the memory management unit 550 may provide an instruction to invalidate the cache data on the primary cache memory 542C. A memory management unit different from the memory management unit 550 that manages the primary cache memories 542A and 542B and the secondary cache memory 543A may be arranged, and that memory management unit may provide an instruction to invalidate the cache data on the primary cache memory 542C.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a volatile memory that stores data;
a controller that controls an operation of a device;
an interface that temporarily stores data input from the device;
a writing unit that controls writing of the data on the volatile memory;
a first communication pathway that connects the interface to the writing unit and is used to transmit the data acquired by the interface to the volatile memory and to transfer the data written on the volatile memory;
a second communication pathway that connects the interface to the writing unit and does not share a route with the first communication pathway;
a switching unit that switches a communication path used to transmit data from the interface to the volatile memory from the first communication pathway to the second communication pathway if the interface has received image data from the device; and an instruction unit that instructs the switching unit to switch the communication path used to transmit the image data from the first communication pathway to the second communication pathway if an instruction to acquire the image data from the device has been provided by the controller, wherein the controller transmits, to the instruction unit, completion information about completion of writing when the writing unit has completed writing of the image data on the volatile memory, and wherein when the completion information has been received, the instruction unit instructs the switching unit to switch the communication path used to transmit data to the volatile memory from the second communication pathway to the first communication pathway.

2. The information processing apparatus according to claim 1, further comprising a second volatile memory that is smaller in memory capacity than and faster in writing speed than the volatile memory; and an invalidating unit that invalidates data for a storage destination associated with the image data out of data stored on the second volatile memory if the controller has provided, to the invalidating unit, an instruction to acquire the image data from the device.

3. The information processing apparatus according to claim 2, wherein the controller transmits information on the storage destination associated with the image data to the invalidating unit before transmitting the instruction to the invalidating unit, and wherein in response to reception of the instruction, the invalidating unit invalidates the data on the second volatile memory corresponding to the information on the storage destination acquired from the controller.

4. The information processing apparatus according to claim 2, further comprising a processing unit that processes the date on the second volatile memory in accordance with an operating system that manages in a virtual storage destination space the storage destination corresponding to the data on the second volatile memory.

5. The information processing apparatus according to claim 4, wherein a physical storage destination is allocated as a destination corresponding to data to be stored to the volatile memory, and wherein the invalidating unit manages in a physical storage destination space the storage destination corresponding to the data stored in the second volatile memory.

6. A semiconductor device comprising:

a controller that controls an operation of a device;

an interface that temporarily stores data input from the device;

a writing unit that controls writing of data on a volatile memory;

a first communication pathway that connects the interface to the writing unit and is used to transmit the data acquired by the interface to the volatile memory and to transfer the data written on the volatile memory;

a second communication pathway that connects the interface to the writing unit and does not share a route with the first communication pathway;

a switching unit that switches a communication path used to transmit data from the interface to the volatile memory from the first communication pathway to the second communication pathway if the interface has received image data from the device; and an instruction unit that instructs the switching unit to switch the communication path used to transmit the image data from the first communication pathway to the second communication pathway if an instruction to acquire the image data from the device has been provided by the controller, wherein the controller transmits, to the instruction unit, completion information about completion of writing when the writing unit has completed writing of the image data on the volatile memory, and wherein when the completion information has been received, the instruction unit instructs the switching unit to switch the communication path used to transmit data to the volatile memory from the second communication pathway to the first communication pathway.

7. An information processing apparatus comprising:

volatile memory means for storing data;

controller means for controlling an operation of a device;

an interface that temporarily stores data input from the device;

writing means for controlling writing of the data on the volatile memory;

a first communication pathway that connects the interface to the writing unit and is used to transmit the data acquired by the interface to the volatile memory means and to transfer the data written on the volatile memory means;

a second communication pathway that connects the interface to the writing unit and does not share a route with the first communication pathway;

switching means for switching a communication path used to transmit data from the interface to the volatile memory means from the first communication pathway to the second communication pathway if the interface has received image data from the device; and an instruction means for instructing the switching means to switch the communication path used to transmit the image data from the first communication pathway to the second communication pathway if an instruction to acquire the image data from the device has been provided by the controller means, wherein the controller means transmits, to the instruction means, completion information about completion of writing when the writing means has completed writing of the image data on the volatile memory means, and wherein when the completion information has been received, the instruction means instructs the switching means to switch the communication path used to transmit data to the volatile memory means from the second communication pathway to the first communication pathway.

* * * * *